Oct. 24, 1939. M. HOLUB 2,177,279
CHAIN APPLYING DEVICE
Filed Feb. 23, 1939
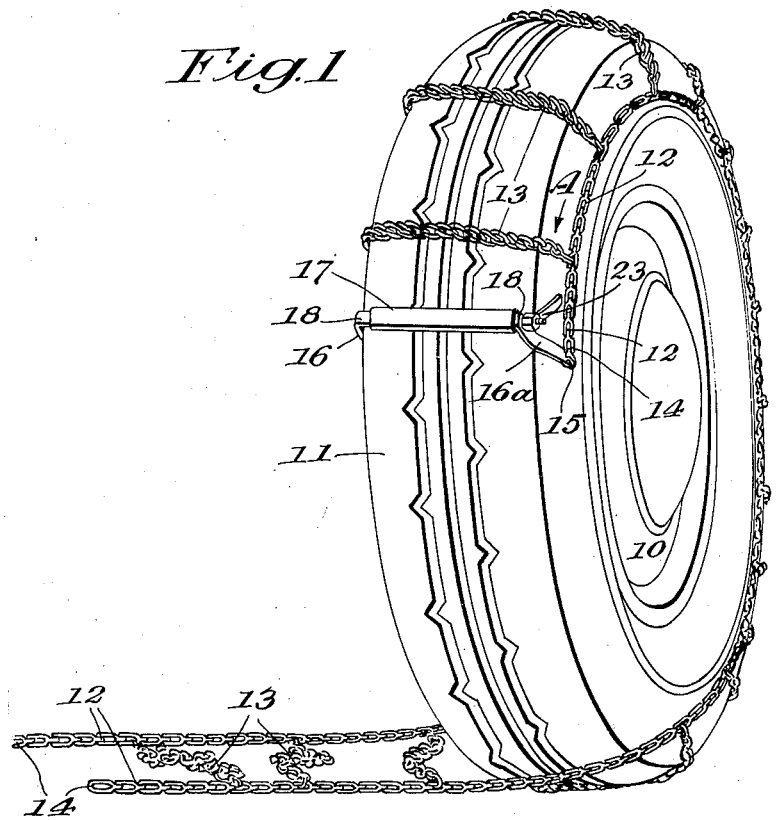
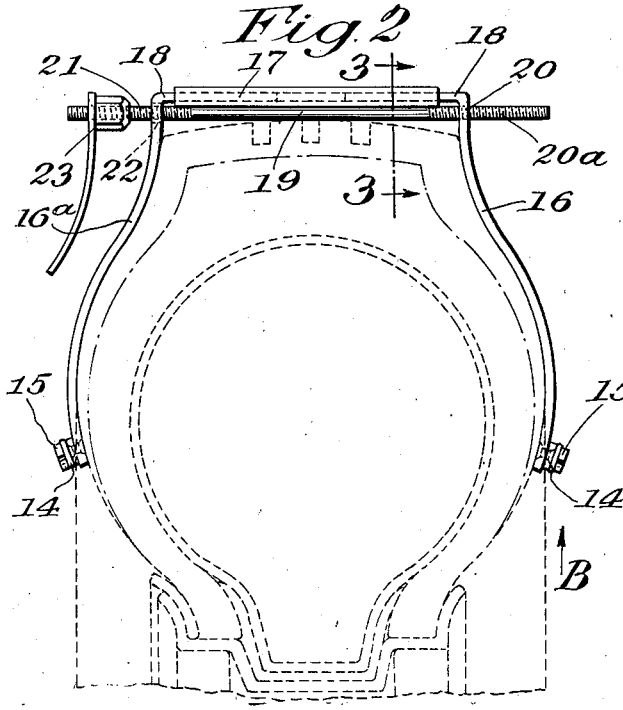
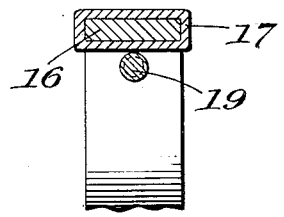
INVENTOR
Miloslav Holub
BY
C. M. Newman
ATTORNEY Patented Oct. 24, 1939

2,177,279

UNITED STATES PATENT OFFICE 2,177,279

CHAIN APPLYING DEVICE

Miloslav Holub, Ridgefield, Conn.

Application February 23, 1939, Serial No. 257,932

3 Claims. (Cl. 81—15.8)

My invention relates to chain applying devices for easily and quickly applying non-skid chains to automobile tires when mounted on wheels forming a part of the vehicle.

The invention has for its object to provide a device which is simple in construction and easily manipulated by which the attachment of a chain on a tire will be expedited.

The invention is adapted for attachment to tires of varying sizes so that the ends of the two side chains may be connected and so that with the rotation of the wheel the chain will be carried up around and laid upon the tire tread without disturbing the fender or other adjacent parts of the wheel and whereby the end portions of the two said side chains will be brought together in position to be linked in any suitable manner.

The old method of applying tire chains is not practical today where the wheel fenders extend down very low and cover the greater part of the tire, since there is not sufficient room between the tire and the fender to apply the chain.

The invention more specifically consists in the novel device for attaching tire chains to tires as will hereinafter be more fully described and specifically pointed out in the claims, reference being had to the accompanying drawing forming a part of this specification and in which:

Fig. 1 shows a perspective view of a vehicle wheel having a pneumatic tire mounted thereon and showing the use of my improved chain applying device as used in the mounting of a chain upon a tire.

Fig. 2 shows an enlarged side view as seen from the arrow A, Fig. 1, as it would appear when attached to a tire shown in dotted lines.

Fig. 3 shows a cross section of the chain applying device taken on line 3—3 of Fig. 2, and Fig. 4 shows an enlarged end view of one of the adjustable side arms with hook attached, see arrow B, Fig. 2.

Similar characters of reference are used to indicate corresponding parts in all of the figures of the drawing.

In this connection 10 indicates a disc type of automobile wheel and 11 a pneumatic tire mounted thereon. In this connection it will be seen from Fig. 1 that I have shown a conventional type of non-slipping tire chain in connection with the tire as in the act of being applied by the use of my improved device for putting on skid chains, and in this respect 12 indicates the annular side chains and 13 the cross chains. In this application the end links 14 of these side chains are employed for attachment to two hooks 15 formed on the lower ends of the side arms 16 and 16a and which hooks are preferably deflected in opposite directions as more clearly illustrated in Fig. 2.

Referring to Fig. 2 it will be seen that this applying device consists in part of a sleeve 17 which is preferably formed flat to slidably receive the correspondingly shaped and aligned inturned end portions 18 of the side arms 16 and 16a beforementioned and whereby the arms may be adjusted to and from each other to engage the opposite sides of a tire and to provide for different size tires, indicated in dotted lines. These arms are of sufficient length and are so shaped as to snugly engage the sides of a tire in a manner to become sufficiently fastened to hold the chain on the tire.

My attaching device is mounted crosswise of the tread of the tire so that the arms 16 and 16a are disposed down against the opposite sides while the sleeve and its adjusting screw 19 rest crosswise upon the face of the tread. The screw as employed threadably engages, as at 20, the upper portion of the side arm 16 whereby it may be moved inward or outward by the turning of the screw, the shank portion 18 of the arm thus freely slides inward or outward when the screw is operated. The shank portion 18 of the oposite arm 16a likewise is free to be adjusted through the medium of the same screw which is also threaded at 21 though passing freely and unengaged through the hole 22 in the arm 16a. The thread 21 on this end of the screw 19 serves for the handled nut mounted thereon and which when tightened up against the arm 16a serves to move it in against the tire and at the same time to also draw the arm 16 in against the other side. The threaded end 20a of the screw 19 serves to provide greater adjustment of the arms in case of larger tires and may or may not be turned with the operation of the nut depending on the amount of resistance set up by the turning of the nut upon the threads 21.

Having thus described my invention what I claim and desire to secure by Letters Patent is:

1. A tire chain attaching device comprising a sleeve, a pair of oppositely positioned arms each having a lateral extension slidably mounted in the sleeve said arms being disposed for engagement with the side of the tire, an adjusting screw connecting the two said arms whereby its turning will draw together or separate the arms, the said arms having upon their end portion means for the attachment of side chains.

2. A tire chain attaching device comprising a sleeve, a pair of oppositely positoned arms each having a lateral extension slidably mounted in the sleeve and disposed for engagement with the sides of a tire, an adjusting screw disposed parallel with the sleeve and threadably engaging one of said arms and means for operating the screw for adjusting the arms guided by the sleeve with respect to the tire, the said arms having upon their inner end portions means for the attachment of side chains.

3. A tire chain attaching device adapted for attachment to a tire comprising a sleeve, a pair of oppositely positioned L-shaped arms, aligned portions of which are slidably mounted in the sleeve and the other members of which are disposed inward for engagement with opposite sides of a tire, an adjusting screw disposed crosswise of the tire and engaging arms and means for operating the screw for adjusting the arms, the said arms having upon their inner end portions means for the attachment of the side chains.

MILOSLAV HOLUB.